WILLIAM A. THOMPSON.
Improvement in Cores for Dikes.
No. 123,306. Patented Jan. 30, 1872.
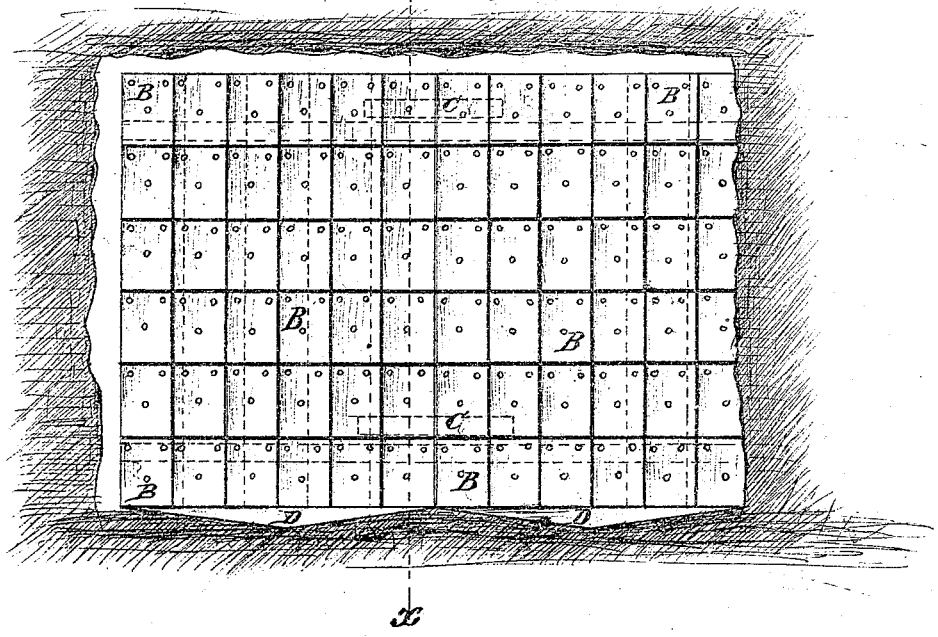
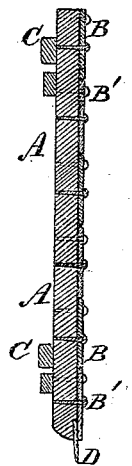
Fig. 2.

No. 123,306

UNITED STATES PATENT OFFICE.

WILLIAM A. THOMPSON, OF BROOKLYN, NEW YORK.

IMPROVEMENT IN CORES FOR DIKES.

Specification forming part of Letters Patent No. 123,306, dated January 30, 1872.

*To all whom it may concern:*

Be it known that I, WILLIAM A. THOMPSON, of Brooklyn, in the county of Kings and State of New York, have invented certain Improvements in Cores for Dikes; and I do hereby declare that the following is a full, clear, and exact description thereof, reference being had to the annexed drawing making part of this specification, in which—

Figure 1 is a vertical section of my improved core, showing the position of the slate covering thereof, the method of fastening the slate to the boards or planks, and the metal shoes upon the bottom for enabling it to be driven into the earth. Fig. 2 is a sectional elevation on line $x\ x$ of Fig. 1, showing the planks or strips of wood to which the slates are attached, together with such slates in position, the cleats which hold the planks or strips together, and the metal shoe or point.

Corresponding letters refer to corresponding parts in both figures.

This invention relates to a core which is to be used in diking or ditching lands as a protection against the operations of muskrats and other animals; and it consists in a core for that purpose which has one or both of its sides covered with slate or other non-corrosive and non-decaying material.

It is well known that, in diking or ditching lands and in forming embankments thereon in the vicinity of oceans, lakes, or rivers, great difficulty arises from the operations of animals whose home is in or near such waters, they frequently forming holes or passages in and through such banks to such an extent as to let large streams of water pass through, and in some instances to cause the removal of large portions of such embankments by the water which comes in contact with them. This invention has for its object the production of a device which shall entirely prevent the injurious operations above described, and enable any person to construct a dike or embankment of any sort which shall prevent the passage of any class of underground animals through it.

To enable others skilled in the art to make and use my invention, I will proceed to describe its construction and operation.

A A refer to a series of strips of wood, which may be of any length, width, and thickness required to make the fence of the desired height, length, and strength, or to make it correspond in these respects with the embankment to be formed. These planks or strips should be thoroughly saturated with coal-tar, sulphate of iron or zinc, or some other preservative substance before being used, but they may be used to advantage without such preparation. B refers to a covering of slate, which may be placed upon both sides of the planks if desired, but need be placed only upon one side in order to serve the purpose for which they are intended. These slates may be of any desired or convenient size, their edges being placed in contact, or nearly so, when they are secured to the fence or to the planks, they being provided with three or more holes, through which nails B' pass for the purpose of securing them to the planks, as shown in Fig. 2. These slates should be so placed as to cover one entire surface of the fence when it is placed in its position in the earth. By making these slates of the proper width, and placing the planks in a vertical position, they may be placed upon such planks, and they be placed in position singly; or they may be formed in sections, and held together by cleats, as shown in the drawing. The former method will, however, be found to facilitate the shipping of the core when it has to be transported for any distance after it has been constructed. D refers to an iron shoe, which is attached to the lower portion of the core by bolts or screws, it being for the purpose of enabling the planks or sections of which it is made to be driven into the ground in certain cases; as, for instance, when it or they are to be placed near where it is desirable to form a dike or ditch below the surface of the earth, and at the same time have the lower ends of the sections or lower edge of the fence below the bottom of such dike or ditch for the purpose of preventing the animals from working under it.

It is apparent that this core may be used when an embankment is to be raised above the surface of the earth, in which case it will only be necessary to place the lower edge of the core upon the surface of the earth, and the earth from any source placed beside it until the requisite height has been reached, in which case the iron shoe may be dispensed with if desired; but it will be found best to use it in all cases in which the portions of the fence are to be driven into the earth to any extent, in which cases it will be advisable to round or bevel the lower end or edge of the planks, as shown in Fig. 2.

What I claim as my invention, and desire to secure by Letters Patent, is—

1. A core, constructed substantially as and for the purpose set forth, it having one or both of its sides or surfaces covered with slate for rendering it impervious to the action of animals.

2. I claim the combination and arrangement of the strips or sections A A, slates B B, and shoe D, substantially as and for the purpose set forth.

In testimony whereof I have signed my name to this specification in the presence of two subscribing witnesses.

WM. A. THOMPSON.

Witnesses:
   JOHN H. GRESHAM,
   GEORGE GRESHAM.